US009429269B2

(12) United States Patent
Wilhelm

(10) Patent No.: US 9,429,269 B2
(45) Date of Patent: Aug. 30, 2016

(54) PORTABLE WATER SPORT BOARD RACK

(71) Applicant: Timothy Wilhelm, Oklawaha, FL (US)

(72) Inventor: Timothy Wilhelm, Oklawaha, FL (US)

( * ) Notice: Subject to any disclaimer, the term of this patent is extended or adjusted under 35 U.S.C. 154(b) by 0 days.

(21) Appl. No.: 14/702,123

(22) Filed: May 1, 2015

(65) Prior Publication Data

US 2015/0259045 A1    Sep. 17, 2015

Related U.S. Application Data

(63) Continuation-in-part of application No. 13/959,278, filed on Aug. 5, 2013, now Pat. No. 9,045,090.

(51) Int. Cl.
| | | |
|---|---|---|
| *A47F 7/00* | (2006.01) | |
| *A63B 35/00* | (2006.01) | |
| *B60R 7/00* | (2006.01) | |
| *B60R 9/12* | (2006.01) | |
| *A47B 81/00* | (2006.01) | |
| *B63B 35/85* | (2006.01) | |
| *A47F 5/02* | (2006.01) | |
| *F16M 13/02* | (2006.01) | |
| *F16B 2/08* | (2006.01) | |
| *B63B 35/79* | (2006.01) | |

(52) U.S. Cl.
CPC .......... *F16M 13/022* (2013.01); *A47B 81/005* (2013.01); *A47F 7/0021* (2013.01); *A47F 7/0028* (2013.01); *B60R 9/12* (2013.01); *B63B 35/7946* (2013.01); *B63B 35/85* (2013.01); *F16B 2/08* (2013.01)

(58) Field of Classification Search
CPC . B63B 25/002; B63B 35/85; B63B 35/7946; B63B 17/00; B63B 21/60; B63B 21/54; B63B 35/79; B63B 2035/855; B63B 2035/818; B63B 2035/715; B60R 9/12; B60R 9/08; A47F 5/02; A47F 7/0028; A47F 7/0035; A47F 5/04; A47F 5/06; A47F 7/0021; A47B 81/00; A47B 49/00; A47B 81/005; A63B 71/0036; A63C 11/028; A47G 25/0664; F16M 13/022; F16B 2/08
USPC ...... 211/85.7, 70.5, 66, 68, 70.7, 85.1, 70.2, 211/70.8, 63, 60.1, 70.6, 59.4, 196, 205, 70, 211/163, 175; 114/364, 347, 343, 382; 224/406, 521, 531, 534, 917.5; 248/220.21, 220.22, 222.51, 222.52, 248/218.4, 219.4
See application file for complete search history.

(56) References Cited

U.S. PATENT DOCUMENTS

| | | | | |
|---|---|---|---|---|
| 3,701,436 A | * | 10/1972 | Adams | 211/70.5 |
| 3,756,420 A | * | 9/1973 | Brown | 211/70.5 |
| 3,802,297 A | | 4/1974 | Schiler | |
| 3,836,058 A | | 9/1974 | Penniman et al. | |
| 3,848,785 A | | 11/1974 | Bott | |
| 3,897,895 A | * | 8/1975 | Read | 224/323 |
| 4,056,220 A | * | 11/1977 | Trimble | 224/406 |
| 4,081,118 A | | 3/1978 | Maso | |

(Continued)

*Primary Examiner* — Jennifer E Novosad
(74) *Attorney, Agent, or Firm* — Jason T. Daniel, Esq.; Daniel Law Offices, P.A.

(57) ABSTRACT

A portable water sport board rack includes a board holder that has an elongated back section, a curved bottom section, and a lip section that define a channel for receiving a large water sport board such as a paddle board. The bottom end of the board holder and an elongated rod are secured onto the top and bottom surfaces of a rotational unit which can rotate 360 degrees about a vertical axis. The elongated rod includes a shape and size to be removably inserted within the rod holder of a boat.

18 Claims, 10 Drawing Sheets

(56) References Cited

U.S. PATENT DOCUMENTS

| | | | |
|---|---|---|---|
| 4,084,735 A * | 4/1978 | Kappas | 224/328 |
| 4,231,501 A * | 11/1980 | Goode | 224/546 |
| 4,232,806 A | 11/1980 | Shald | |
| 4,234,112 A * | 11/1980 | Gallant | 224/559 |
| 4,274,571 A | 6/1981 | Lafreniere et al. | |
| 4,450,989 A * | 5/1984 | Bogar, Jr. | 224/549 |
| 4,582,015 A | 4/1986 | Hunter | |
| 4,776,471 A * | 10/1988 | Elkins | 211/64 |
| 4,778,141 A | 10/1988 | Bogar | |
| 4,863,082 A | 9/1989 | Evans et al. | |
| 5,078,279 A * | 1/1992 | Hancock et al. | 211/64 |
| 5,344,032 A * | 9/1994 | Ramsdell | 211/64 |
| 5,350,094 A * | 9/1994 | Morford | 224/551 |
| 5,435,093 A * | 7/1995 | Minorics et al. | 43/19.2 |
| 5,524,772 A * | 6/1996 | Simmons | 211/4 |
| 5,582,044 A | 12/1996 | Bolich | |
| 5,590,618 A * | 1/1997 | Marshall | 114/343 |
| 5,673,507 A * | 10/1997 | Stokes, Jr. | 43/21.2 |
| 5,752,638 A * | 5/1998 | Meeks | 224/547 |
| 5,788,133 A | 8/1998 | Mareno | |
| 5,884,781 A | 3/1999 | Ehrhart | |
| 5,901,890 A * | 5/1999 | Stokes | 224/406 |
| 5,906,304 A | 5/1999 | Baldacchino | |
| 5,915,572 A * | 6/1999 | Hancock | 211/64 |
| 5,979,102 A | 11/1999 | Sagryn | |
| 6,019,265 A | 2/2000 | Deloza | |
| 6,293,412 B1 * | 9/2001 | Draper | 211/4 |
| 6,637,707 B1 * | 10/2003 | Gates et al. | 248/224.7 |
| 6,793,109 B2 * | 9/2004 | Gates et al. | 224/401 |
| 6,863,199 B2 | 3/2005 | Child | |
| D508,455 S | 8/2005 | Oakley et al. | |
| 6,929,223 B2 * | 8/2005 | Hancock et al. | 248/74.2 |
| 6,935,517 B1 * | 8/2005 | Reed et al. | 211/85.7 |
| 7,043,869 B1 * | 5/2006 | Hubbard | 43/21.2 |
| 7,100,808 B2 * | 9/2006 | Hancock et al. | 224/547 |
| 7,370,599 B1 | 5/2008 | Berman et al. | |
| 7,670,201 B2 | 3/2010 | Winter | |
| 8,757,399 B2 | 6/2014 | Wolfbauer | |
| 9,045,090 B2 * | 6/2015 | Wilhelm | 211/85.7 |
| 2001/0006037 A1 * | 7/2001 | Badley | 114/253 |
| 2005/0155999 A1 | 7/2005 | Gasper | |
| 2006/0037527 A1 | 2/2006 | Aff | |
| 2006/0226321 A1 * | 10/2006 | Tracy | 248/301 |
| 2007/0057000 A1 | 3/2007 | Webster | |
| 2007/0062992 A1 | 3/2007 | Hepworth et al. | |
| 2007/0209567 A1 | 9/2007 | Fee et al. | |
| 2009/0025188 A1 * | 1/2009 | Leyden et al. | 24/115 H |
| 2010/0147712 A1 | 6/2010 | Filho et al. | |
| 2013/0047907 A1 | 2/2013 | Pimental | |
| 2014/0021155 A1 * | 1/2014 | Ferre-Rangel et al. | 211/182 |
| 2015/0259045 A1 * | 9/2015 | Wilhelm | 211/85.7 |

\* cited by examiner

PORTABLE WATER SPORT BOARD RACK

This application is a continuation-in-part of, and claims the benefit of copending U.S. application Ser. No. 13/959,278 filed on Aug. 5, 2013, the contents of which are incorporated herein by reference.

TECHNICAL FIELD

The present invention relates generally to boating accessories, and more particularly to a portable rack for transporting and storing paddleboards.

BACKGROUND

The statements in this section merely provide background information related to the present disclosure and may not constitute prior art.

Paddle boarding is quickly becoming one of the most popular water sport activities in the United States. In this regard, it is not uncommon for users to transport one or more paddleboards to a particular cove or other such location utilizing a ski boat, fishing boat or other such vessel.

Although there are known racks for transporting small water sport boards such as wakeboards and water skis, for example, these racks are not capable of supporting large water sport boards such as a paddle board, for example. As such, boaters are forced to store these boards on the floor or other unsecured spaces within the boat, thereby posing a tripping hazard to the boat occupants and often times resulting in damage to the board or boards themselves.

Accordingly, it would be beneficial to provide a lightweight portable water sport board rack that can accommodate large water sport boards and that can be utilized interchangeably with any type of boat, without the need for special mounting hardware.

SUMMARY OF THE INVENTION

The present invention is directed to a portable water sport board rack. One embodiment of the present invention can include a board holder that has an elongated back section, a curved bottom section, and a lip section that define a channel for receiving a large water sport board such as a paddle board, for example. The board holder is connected to a rotational unit, which is also connected to an elongated rod. The rotational unit can rotate the board holder and rod independently about a 360 degree axis, while maintaining the elongated back section in a generally vertical orientation.

In one embodiment, an elongated rod can include a shape and size that is complementary to a rod holder of a boat, so as to be removably positioned into the same during operation of the boat and during a transport/trailering procedure.

In another embodiment, a second board holder can be secured to the rotational unit. The second board holder can function to receive and engage a second watersport board.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
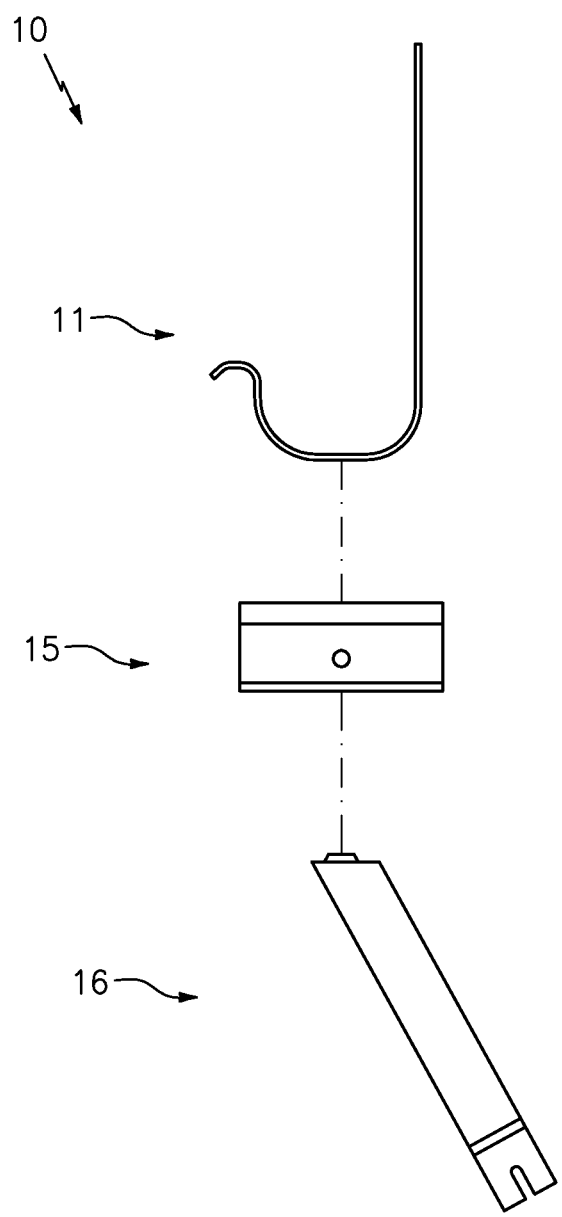
FIG. 1 is an exploded parts view of the portable water sport board rack, in accordance with one embodiment of the invention.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 2.

As described throughout this document, the terms " water sport board" and "board" are used to describe large water sport equipment such as paddle boards, surfboards, windsurfing boards, kayaks and any other such device which can benefit from being stored by the board rack disclosed herein.

As will be described below, the portable board rack can work in conjunction with one or more rod holders of a boat. As is known to those of skill in the art, conventional rod holders include an elongated channel that is typically at an angle of between, substantially 0 and 60 degrees, for example, relative to the top surface of the boats gunwale. Rod holders are extremely well known in the art, and include U.S. Pat. No. 4,778,141 to Bogar, the contents of which are incorporated herein by reference. Moreover, it is also contemplated that two or more individual racks can be utilized with two or more individual rod holders to receive and store long watersport boards. As such, the device can also be produced as a kit containing multiple individual racks.

FIGS. 1-7 illustrate one embodiment of a portable water sport board rack 10 that is useful for understanding the inventive concepts disclosed herein. As will be described below, the rack 10 can function to receive one or more water sport boards and to secure the same in a manner which allows for easy transport within a boat. The rack 10 also includes a rotational device for adjusting the position of an angled rod, so as to engage boat rod holders having various orientations. The same is also utilized to allow a user to change the orientation of the water sport board itself, while being secured on the boat.

FIG. 1 illustrates an exploded parts view of one embodiment of the rack 10, which includes a rotational device 15 that is interposed between a water sport board holder 11 and an elongated angled rod 16.

As shown, the board holder 11 can include an elongated, generally J-shaped member having a generally planar back section 11a, a curved bottom section 11b, and a lip section 11c that form a channel/shelf for receiving a water sport board. In this regard, the board holder 11 can be constructed from any number of durable and resilient materials suitable for prolonged exposure to sun and water. Several non-limiting examples including aluminum, plastic, PVC and the like. Although not illustrated, the board holder can be completely or partially coated in a relatively soft material such as rubber, for example, which can function to protect the board against scratching, and increase the coefficient of friction between the board and the rack holder 11, to prevent unintentional separation.

Figure 2:
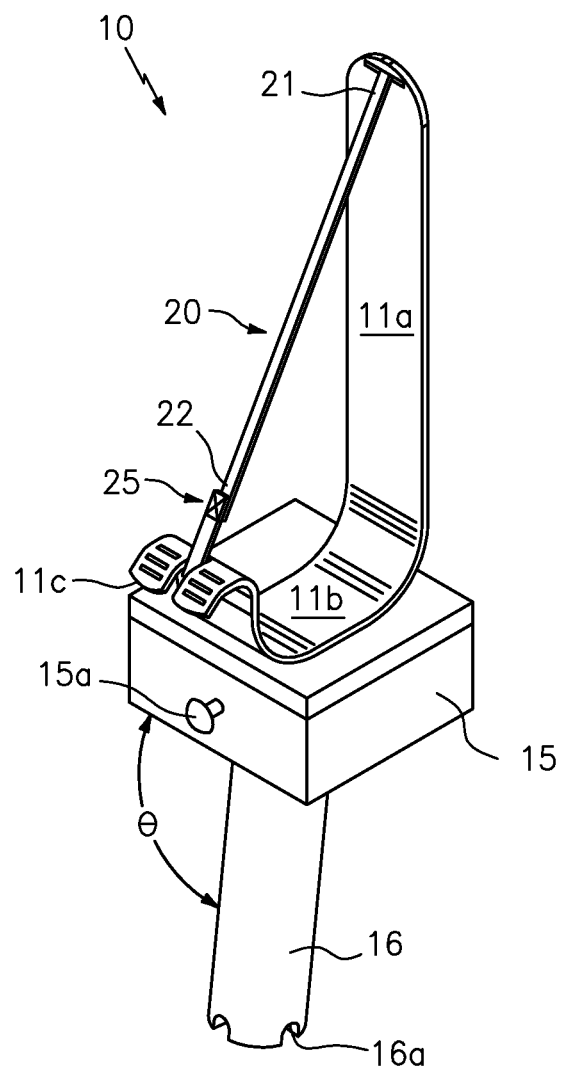
FIG. 2 is a perspective view of the portable water sport board rack, in accordance with one embodiment of the invention.
Figure 3A:
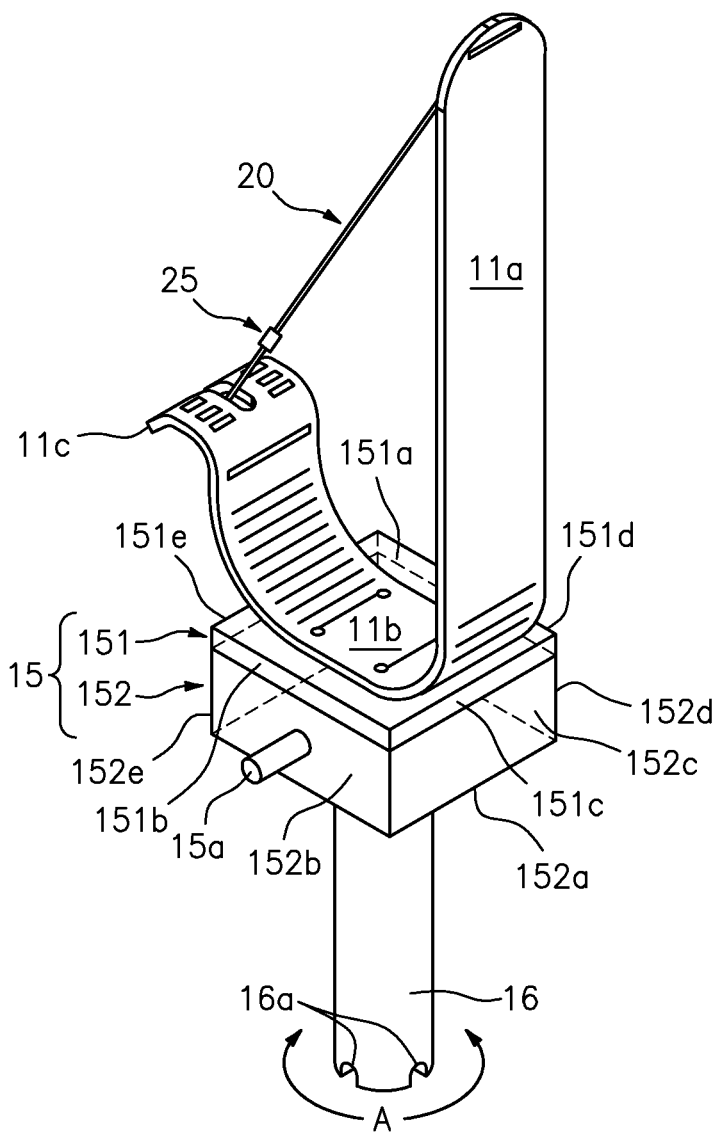
FIG. 3A is a side view of the portable water sport board rack demonstrating the operation of the rotational device.
Figure 3B:
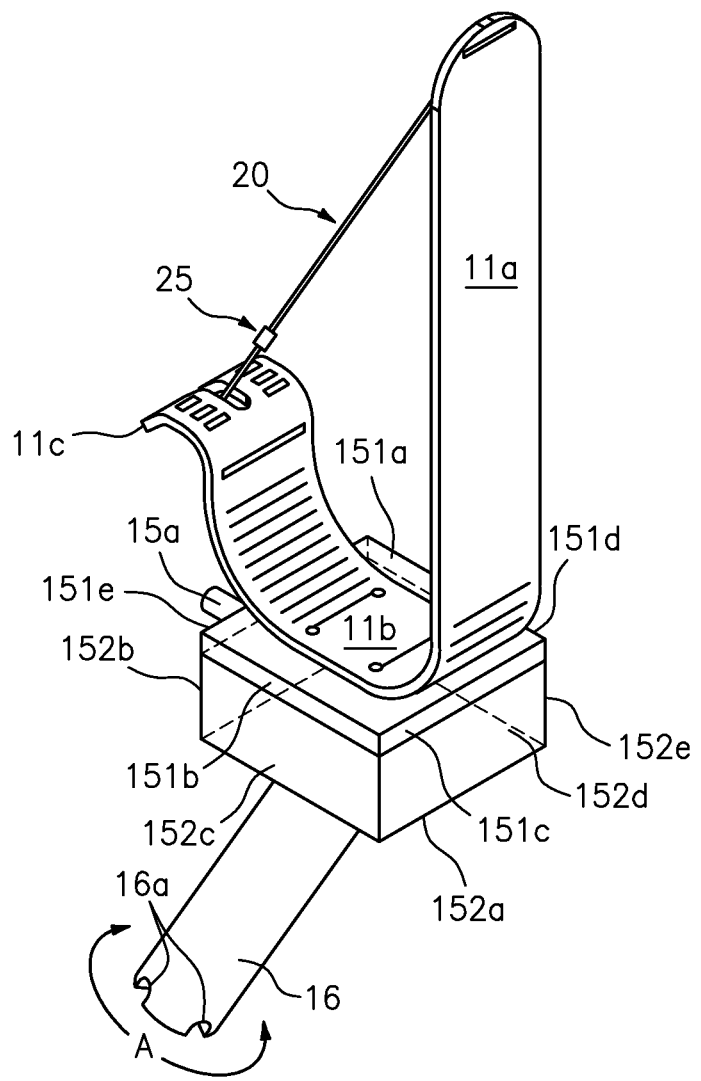
FIG. 3B is another side view of the portable water sport board rack demonstrating the operation of the rotational device.
Figure 3C:
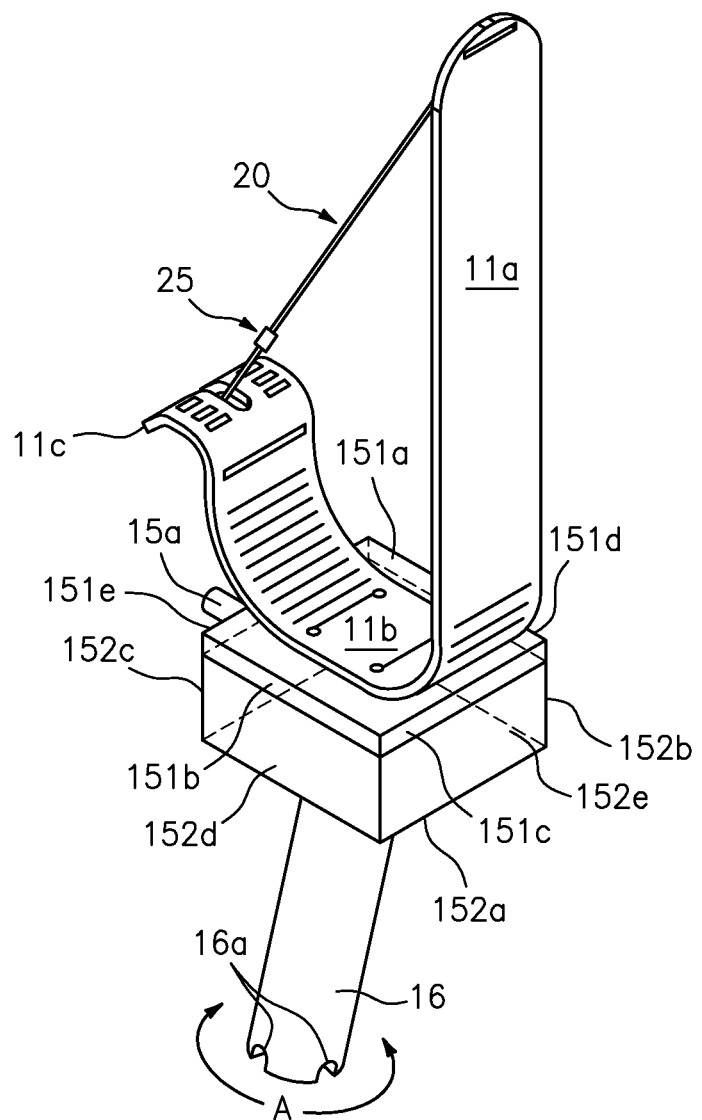
FIG. 3C is another side view of the portable water sport board rack demonstrating the operation of the rotational device.
Figure 3D:
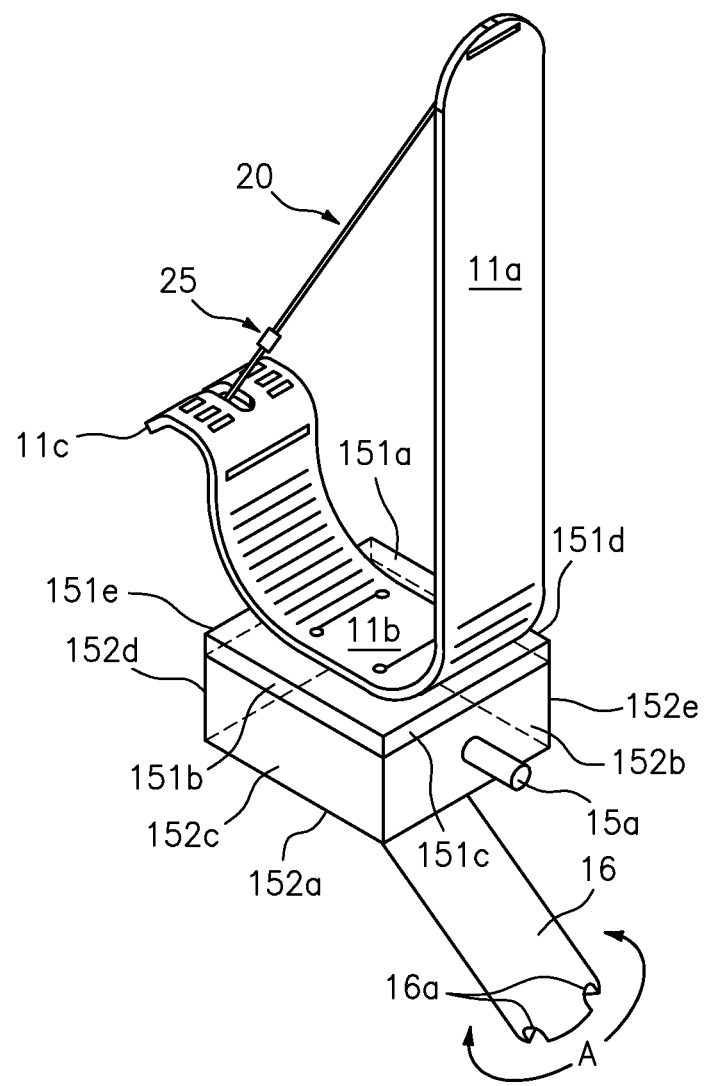
FIG. 3D is another side view of the portable water sport board rack demonstrating the operation of the rotational device.

As shown in FIG. 2, one embodiment of the device 10 can also include a retention strap 20 that can function to physically secure a board within the holder 11. In the preferred embodiment, the retention strap 20 can be constructed from a durable material such as nylon, for example, having a first end 21 that is permanently affixed to the top end of the planar section 11a. The second end of the strap 22 can be removably secured to the lip section 11c via a connector 25 such as a clip, snap or clasp, for example. Of course, any number of other known devices capable of securing the end of the strap to the lip can also be utilized. Moreover, in another embodiment, the strap can be constructed from an elastomeric material that is permanently secured between the lip and vertical sections of the holder 11.

As shown best in FIGS. 3A-3D, the rotational device 15 can function to independently rotate the rod 16 and the board holder 11 about a 360 degree vertical axis (see arrow A). In the preferred embodiment, the rotational device 15 can comprise of a rotating shot-pin locking mechanism such as that described in U.S. Pat. No. 3,802,297, the contents of which are incorporated herein by reference. As shown, the rotational device 15 can include a top plate 151 and a bottom plate 152 that are rotatably connected together. The top plate can include a generally planar top surface 151a having a plurality of side surfaces 151b, 151c, 151d and 151e extending downward therefrom. The bottom plate 152 can include a generally planar bottom surface 152a having a plurality of side surfaces 152b, 152c, 152d and 152e extending upward therefrom. In this regard, and as shown by the figures, the top and bottom plate can rotate 360 degrees horizontally with respect to one another, and the locking member 15a can secure the plates at any desirable position. Of course, any number of other devices such as a traditional ball and socket hinge with a locking pin, for example, that are capable of engaging and rotating each of the members 11 and 16 about each other in a controlled manner can also be utilized herein.

The angled rod 16 of the rack 10 can function to engage the rod holder 5 of a boat 1 by being inserted therein. As such, the rod 16 can preferably be made from an elongated generally tubular member having an outside diameter that is complementary to the inside diameter of a standard rod holder. Additionally, a plurality of notches 16a can be disposed along the bottom end of the rod 16. These notches functioning to engage the pin and/or shaft (not illustrated) that is traditionally found at the bottom end of a rod holder so as to prevent the inserted rack from twisting while in use. Such a feature can allow the portable rack 10 to be easily and quickly secured to the boat without the need for screws, nails or clamps which can damage the surface of the vessel. Moreover, this feature allows the rack and any installed water boards to be quickly removed from the boat and transported together to another location.

As will be known to those of skill in the art, most conventional rod holders include an inside diameter (i.e., opening) of approximately 1-½ inches and are disposed within the gunwale at a vertical angle of approximately 30 degrees. As such, in one preferred embodiment, the rod 16 can include an outside diameter of 1-⅜ inches, and can be connected to, and extend downward from the bottom end of the rotational device 15 at a relative angle θ of approximately 30 degrees to the bottom end of the device 15 (See FIG. 2). Of course any number of other rod thicknesses and relative angles of between 0 and 90 degrees to the bottom of the rotational unit, for example, are also contemplated. In either instance, such a feature will enable the installed rack 10 to be positioned within a boat so that the back portion of the holder 11a is vertical (See FIG. 5).

Figure 4:
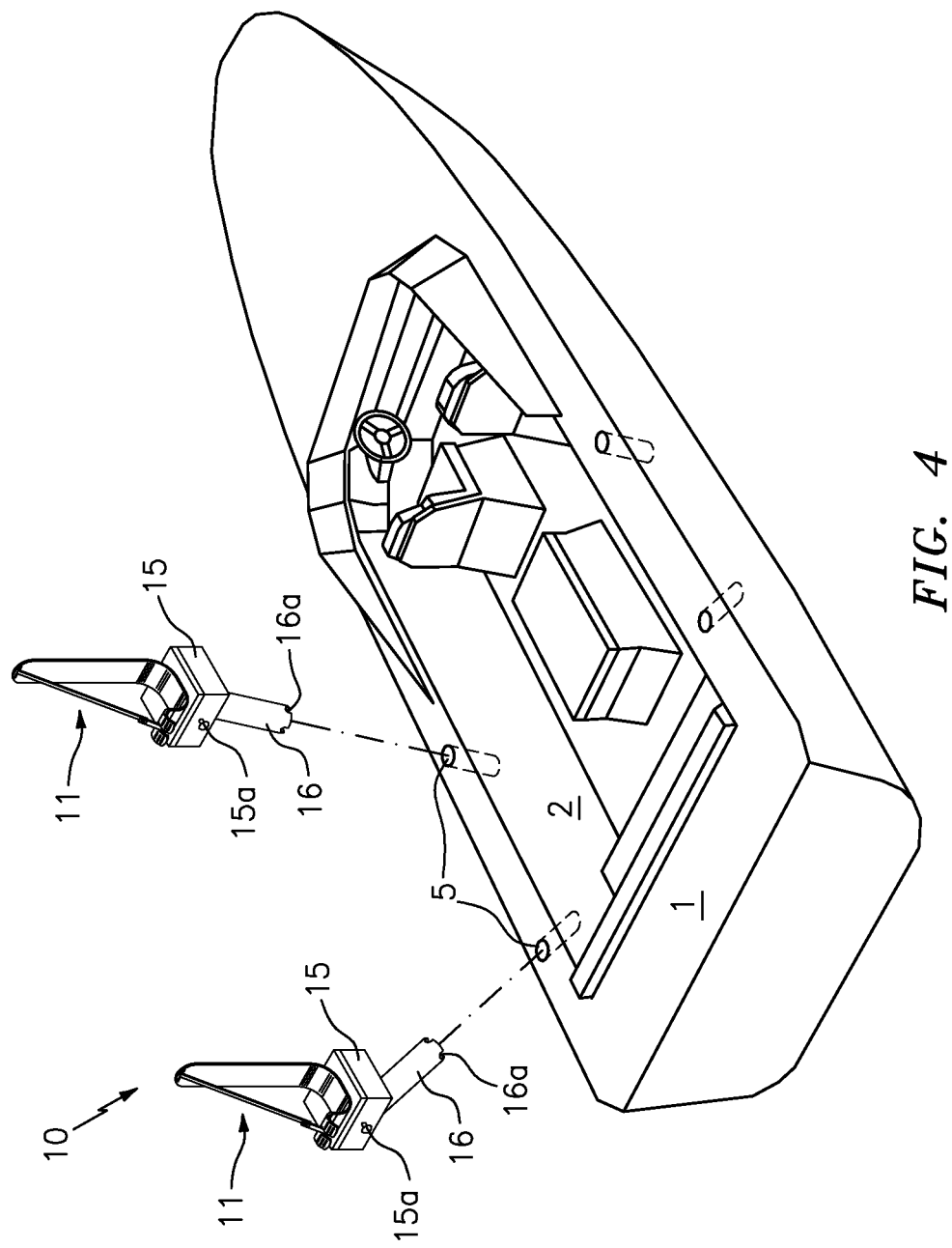
FIG. 4 is a perspective view of the portable water sport board rack in operation, and in accordance with one embodiment of the invention.

As shown in FIG. 4, the ability of the rotational device to orient the holder 11 and the rod 16 at different positions allows the rack 10 to engage the rod holders of a boat at any number of different positions. In some instances, depending on the length of the water sport board, it may be beneficial to install two racks along the same side of a boat, in order to engage the board along its top and bottom ends. As such, when installing the device(s) onto a boat, the rotational device 15 can selectively orient the rod 16 to align with the direction of a rod holder 5, on the gunwale 2, before inserting the rod into the holder. As noted above, the rod is mounted to the bottom of the rotational device at substantially identical angle as the rod holder 5, therefore, the installed rack(s) 10 will orient the planar member in a vertical position.

Figure 5:
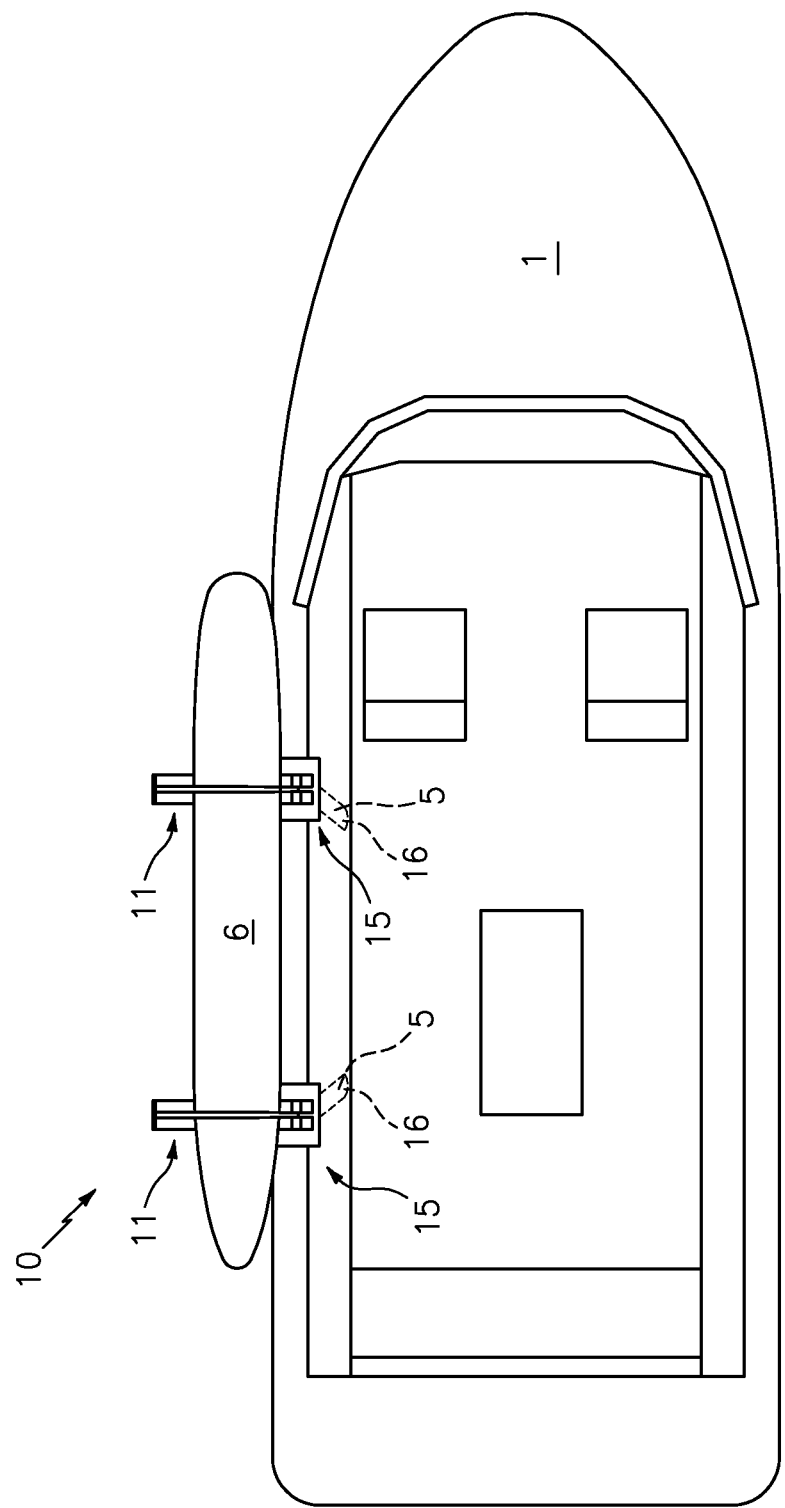
FIG. 5 is top view of the portable water sport board rack in operation, and in an open orientation, in accordance with the one embodiment of the invention.

FIG. 5 illustrates the device(s) 10 in a closed/trailer position, wherein the rotational device 15 positions holder 11 so that the back section 11a is located within the interior space of the boat. As shown, such a feature advantageously allows one or more racks 10 to position a water sport board 6 within the boat for safe trailering to the water.

Figure 6:
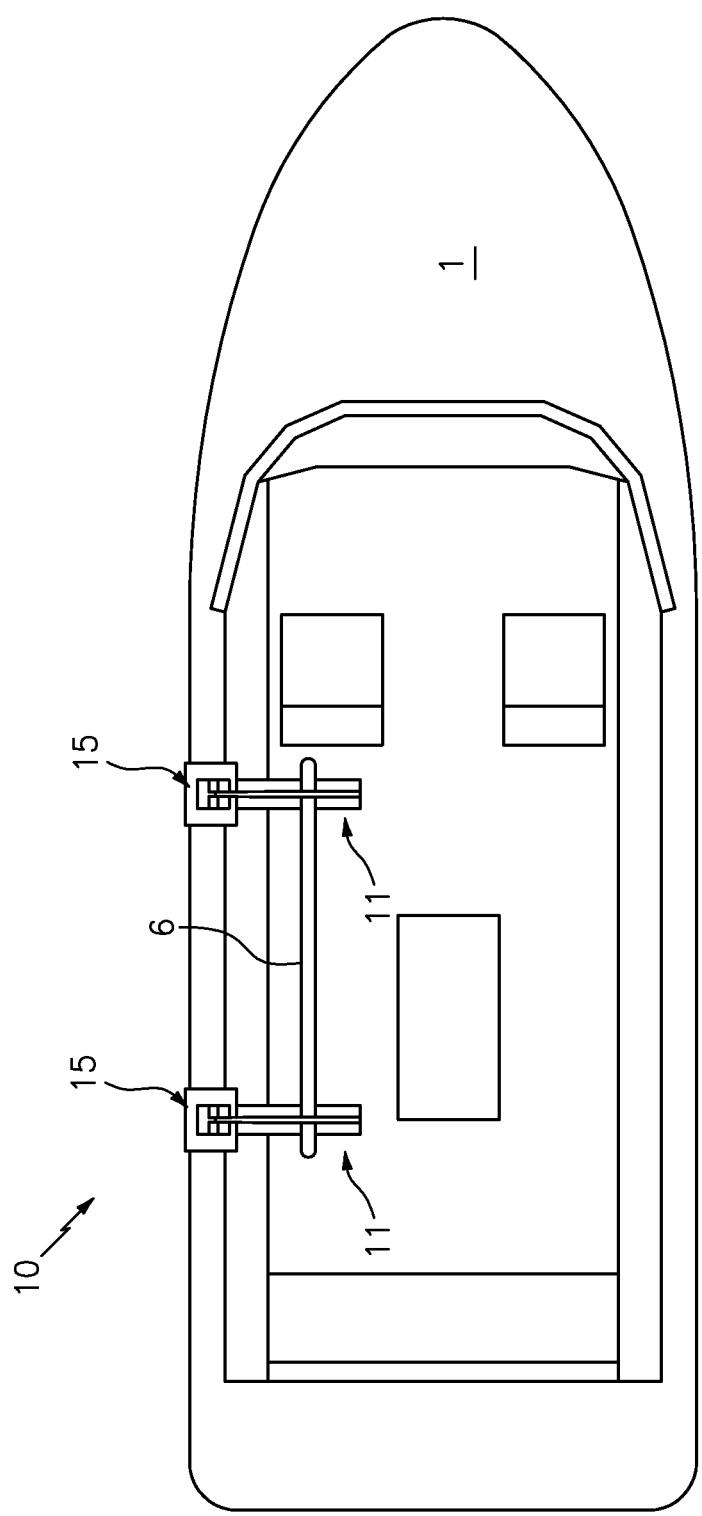
FIG. 6 is top view of the portable water sport board rack in operation, and in a closed orientation, in accordance with the one embodiment of the invention.

FIG. 6 illustrates the device(s) 10 in an open position, wherein the rotational device 15 positions holder 11 so that the back section 11a extends outward from the interior space of the boat. As shown, such a feature advantageously allows one or more racks 10 to position a water sport board 6 in a secure manner that does not take up any usable space within the boat.

Figure 7:
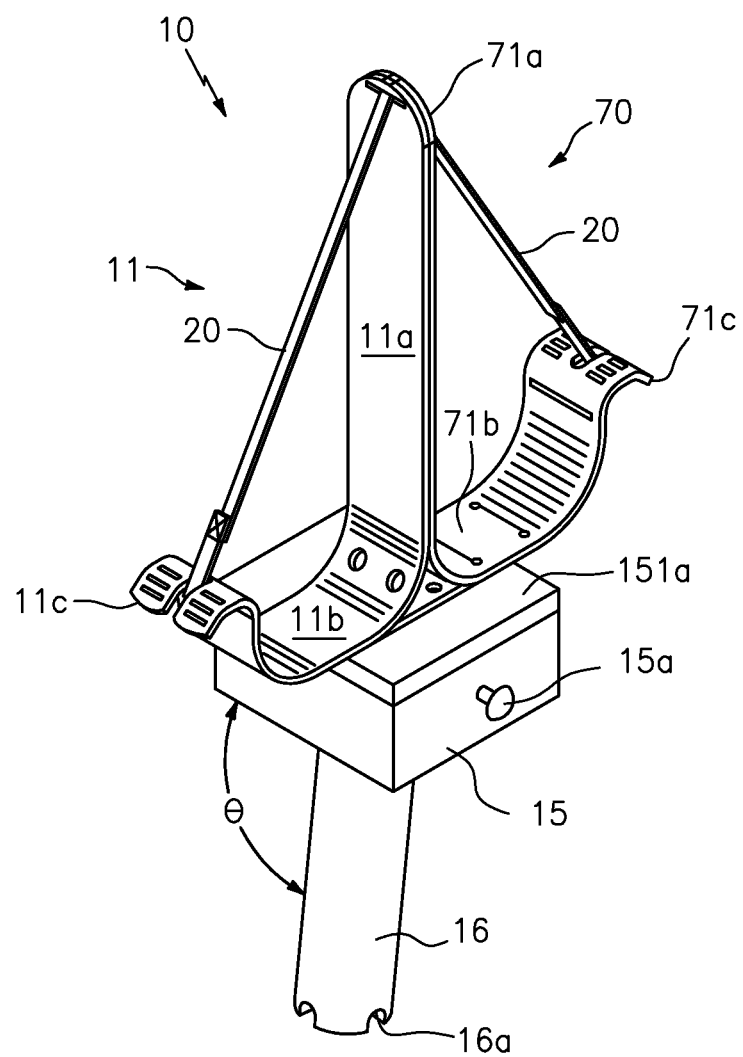
FIG. 7 is a perspective view of the portable water sport board rack, in accordance with another embodiment of the invention.

FIG. 7 illustrates another embodiment of the rack 10 that further includes a second board holder 70. As shown, second board holder 70 can include a substantially identical construction as the above described holder 11 that includes an elongated, generally J-shaped member having a generally planar back section 71a, a curved bottom section 71b, and a lip section 71c that form a channel/shelf for receiving a second water sport board. In the preferred embodiment, board holders 11 and 70 can be arranged wherein the planar sections 11a and 71a are joined together, and the bottom ends of the curved sections 11b and 71b are each secured onto the top surface of the rotating member 151a. As shown, each of the holders can also include retention straps such as the strap 20 described above.

As described herein, one or more elements of the portable water sport board rack 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements such as the board holders 11 and 70, for example, may be formed together as one continuous element, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A portable water sport board rack, comprising:
a board holder that includes an elongated generally planar back section, a curved bottom section, and a lip section that define a channel for receiving a water sport board;
a rotational unit having a top surface, a bottom surface and a locking member, said top surface being connected to a bottom end of the board holder,
wherein the top and bottom surfaces of the rotational device are rotatably engaged and are configured to rotate about each other in a 360 degree relative manner; and
an elongated rod having a first end that is secured to the bottom surface of the rotational unit at a first angle, and a second end having a shape and dimension that is complementary to a shape and dimension of a boat rod holder.

2. The rack of claim 1, wherein the locking member functions to prevent rotation of the rotational device when engaged.

3. The rack of claim 1, wherein the rotational device comprises a rotating shot-pin locking mechanism.

4. The rack of claim 1, wherein the rotational device is configured to transition the rack between a closed position wherein the planar back section of the board holder is located within an interior section of a boat, and an open position wherein the planar back section of the board holder is not located within an interior section of a boat.

5. The rack of claim 4, wherein the rotational unit is further configured to maintain the planar back section in a vertical position when the device is in each of the open position and the closed position.

6. The rack of claim 1, further comprising:
a plurality of notches that are disposed along the second end of the rod, said notches being configured to engage a locking pin of the rod holder to prevent rotation of the device.

7. The rack of claim 1, wherein said angle is approximately 30 degrees relative to the bottom surface of the rotational unit.

8. The rack of claim 1, wherein said angle is between approximately 0 and 90 degrees relative to the bottom surface of the rotational unit.

9. The rack of claim 1, further comprising:
a retention strap that is positioned between a top end of the planar back section, and the lip section.

10. The rack of claim 9, further comprising:
a connector that is configured to repeatedly engage and disengage the strap with the lip section.

11. The rack of claim 9, wherein the retention strap is constructed from a durable non-elastomeric material.

12. The rack of claim 9, wherein the retention strap is constructed from an elastic material that is permanently secured to the planar member and the lip at each end.

13. A portable water sport board rack, comprising:
a first board holder that includes an elongated generally planar back section, a curved bottom section, and a lip section that define a channel for receiving a water sport board;
a second board holder that also includes an elongated generally planar back section, a curved bottom section, and a lip section that define another channel for receiving another water sport board;
a rotational unit having a top surface, a bottom surface and a locking member, said top surface being connected to a bottom end of each of the first and second board holders,
wherein the top and bottom surfaces of the rotational device are rotatably engaged and are configured to rotate about each other in a 360 degree relative manner; and
an elongated rod having a first end that is secured to the bottom surface of the rotational unit at a first angle, and a second end having a shape and dimension that complementary to a shape and dimension of a boat rod holder.

14. The rack of claim 13, wherein the locking member functions to prevent rotation of the rotational device when engaged.

15. The rack of claim 13, further comprising:
a plurality of notches that are disposed along the second end of the rod, said notches being configured to engage a locking pin of the rod holder to prevent rotation of the device.

16. The rack of claim 13, wherein said first angle is approximately 30 degrees relative to the bottom surface of the rotational unit.

17. The rack of claim 13, wherein said angle is between approximately 0 and 90 degrees relative to the bottom surface of the rotational unit.

18. The rack of claim 13, further comprising:
a first and second retention strap that are positioned between a top end of the planar back section, and the lip section of the first and second board holders, respectively.

\* \* \* \* \*